Aug. 30, 1938.   M. WILLIAMS   2,128,445
AERATING DEVICE FOR USE IN THE PRODUCTION OF ACETIC ACID FROM ALCOHOL
Filed Feb. 8, 1937
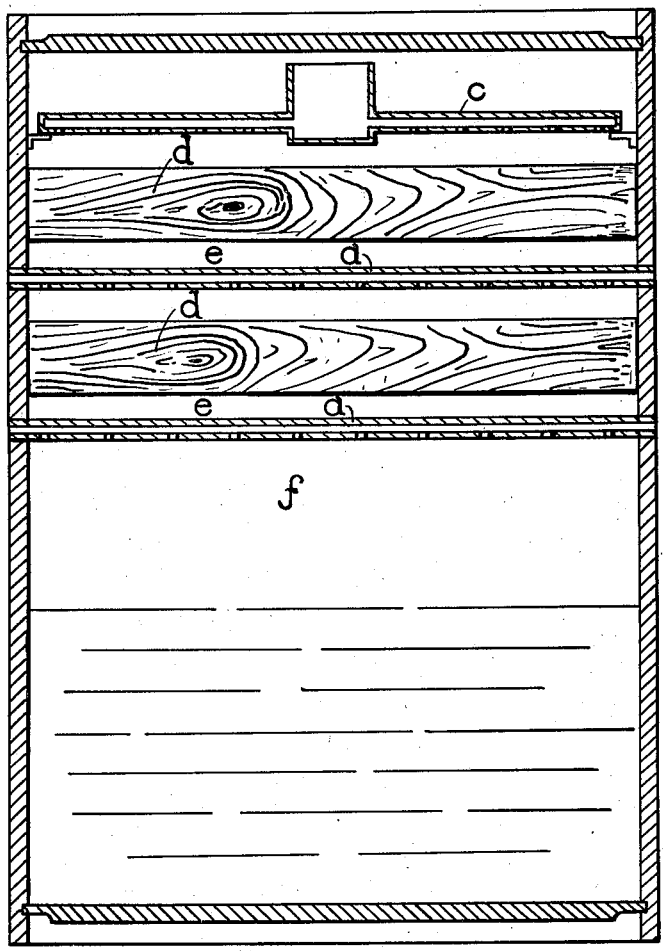
Inventor:
Morgan Williams
By. Chadwick Company
ATTYS.

Patented Aug. 30, 1938

2,128,445

UNITED STATES PATENT OFFICE 2,128,445

AERATING DEVICE FOR USE IN THE PRODUCTION OF ACETIC ACID FROM ALCOHOL

Morgan Williams, Worcester, England

Application February 8, 1937, Serial No. 124,671
In Great Britain February 17, 1936

1 Claim. (Cl. 99—245)

The invention relates to an aerating device for use in the production of acetic acid from alcohol and is shown in the accompanying drawing in diagrammatic view.

The invention consists in a set of ebonite tubes $a$ arranged in two tiers each of four tubes with ten holes of ¼ inch diameter in the lower surface of the tubes, the tubes passing through the vat, and close under the acetifying medium $d$ which is composed of birch twigs.

$e$ is the space between the acetifying medium and the ebonite tubes $a$.

$c$ is the sparger.

$d$ denotes the birch twigs.

$f$ is the space in the vat occupied by the liquid until acetification is completed.

By the use of this invention there is a regular aeration throughout the whole of the acetifying medium, and an increase yield of 25% of acetic acid from alcohol in the manufacture of vinegar.

I claim:—

An aerating device for use in the production of acetic acid from alcohol comprising, in combination, a vat, a sparger mounted in the upper part of said vat, brackets carried by the wall of the vat supporting said sparger, a layer of birch twigs mounted in the vat below said sparger spaced therefrom, a tier of tubes mounted in the walls of the vat below said birch twigs and spaced therefrom, perforations in said tubes, said tubes being open at each end and passing through said walls, a second layer of birch twigs below said tubes and spaced therefrom, and a second tier of tubes mounted in the walls below said second layer of birch twigs and spaced therefrom, the part of the vat below said second tier of tubes containing liquid.

MORGAN WILLIAMS.